United States Patent [19]
Harada et al.

[11] Patent Number: 5,572,524
[45] Date of Patent: Nov. 5, 1996

[54] DIGITAL-TRANSMISSION/ANALOG-TRANSMISSION CHANGEOVER APPARATUS

[75] Inventors: Yuichi Harada; Takayuki Iwasa; Hitomi Akiyoshi, all of Nagoya, Japan

[73] Assignee: Fujitsu Limited, Kanagawa, Japan

[21] Appl. No.: 139,426

[22] Filed: Oct. 20, 1993

[30] Foreign Application Priority Data

Oct. 20, 1992 [JP] Japan .................................. 4-281302

[51] Int. Cl.[6] .................................................. H04L 12/00
[52] U.S. Cl. ........................ 370/84; 370/110.1; 375/377
[58] Field of Search ................................... 375/220, 222, 375/377; 370/60, 79, 84, 85.13, 110.1; 379/93–94, 96, 100

[56] References Cited

U.S. PATENT DOCUMENTS

| | | | |
|---|---|---|---|
| 4,746,986 | 5/1988 | Tanigawa | 379/100 |
| 4,961,185 | 10/1990 | Sawada | 370/79 |
| 5,050,005 | 9/1991 | Kagami | 379/100 |
| 5,065,425 | 11/1991 | Lecomte et al. | 379/93 |
| 5,067,125 | 11/1991 | Tsuchida | 370/79 |
| 5,113,396 | 5/1992 | Kagami | 370/110.1 |
| 5,134,611 | 7/1992 | Steinka et al. | 370/79 |
| 5,267,245 | 11/1993 | Maruyama et al. | 370/110.1 |

Primary Examiner—Young T. Tse

[57] ABSTRACT

A digital-transmission/analog-transmission changeover apparatus in a communication system for performing a digital transmission between a digital terminal and a terminal accommodated by an ISDN, and performing an analog transmission via the ISDN and an analog network, between the digital terminal and a terminal accommodated by the analog network includes a rate converter for converting the rate of data, which has entered from the digital terminal, to a rate suited to the ISDN, and for converting the rate of data, which has entered from the ISDN, to the rate of the digital terminal. A modulator/demodulator for modulating digital data, which has entered from the digital terminal, into an analog signal and demodulating the analog signal into digital data is provided. A PCM converter is connected to the modulator/demodulator for converting the analog signal into digital data at a rate suited to the ISDN, and converting digital data from the ISDN into the analog signal. An ISDN communication controller is connected to the rate converter and the PCM converter for performing communication control in accordance with an ISDN protocol. A connection controller connects the digital terminal either to the rate converter or to the modulator/demodulator.

8 Claims, 15 Drawing Sheets

| DATA RATE (bit/s) | INTERMEDIATE RATE | | |
|---|---|---|---|
| | 8 kbit/s | 16 kbit/s | 32 kbit/s |
| 600 | X | | |
| 1200 | X | | |
| 2400 | X | | |
| 4800 | X | | |
| 7200 | | X | |
| 9600 | | X | |
| 12000 | | | X |
| 14400 | | | X |
| 19200 | | | X |

FIG. 7

| OCTET NO. | BIT NO. | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

FIG. 8(a)

| 0 | 0 | 0 | 0 | 0 | 0 | 0 | 0 | 0 |
|---|---|---|---|---|---|---|---|---|
| S1 | D1 | D1 | D1 | D1 | D1 | D1 | D1 | 1 |
| X | D2 | D1 | D1 | D2 | D2 | D2 | D1 | 1 |
| S3 | D3 | D3 | D3 | D2 | D2 | D3 | D3 | 1 |
| S4 | D3 | D3 | D3 | D3 | 0 | 1 | 0 | 1 |
| E7 | E6 | E5 | E4 | 0 | D4 | D4 | D4 | 1 |
| S6 | D4 | D4 | D4 | D4 | D5 | D5 | D4 | 1 |
| X | D5 | D5 | D5 | D5 | D5 | D5 | D5 | 1 |
| S8 | D6 | D6 | D5 | D5 | D6 | D6 | D6 | 1 |
| S9 | D6 | D6 | D6 | D6 | | | | 1 |

FIG. 8(b)

| 0 | 0 | 0 | 0 | 0 | 0 | 0 | 0 | 0 |
|---|---|---|---|---|---|---|---|---|
| S1 | D2 | D2 | D1 | D1 | D2 | D1 | D1 | 1 |
| X | D3 | D3 | D3 | D1 | D4 | D2 | D2 | 1 |
| S3 | D5 | D5 | D4 | D3 | D5 | D4 | D4 | 1 |
| S4 | D6 | D6 | D6 | D4 | D6 | D5 | D5 | 1 |
| E7 | E6 | E5 | E4 | D6 | 1 | 0 | 0 | 1 |
| S6 | D8 | D8 | D7 | 0 | D7 | D7 | D7 | 1 |
| X | D9 | D9 | D9 | D7 | D8 | D8 | D8 | 1 |
| S8 | D11 | D11 | D10 | D9 | D10 | D10 | D10 | 1 |
| S9 | D12 | D12 | D12 | D10 | D11 | D12 | D11 | 1 |
| | | | | D12 | | | | |

FIG. 8(c)

| 0 | 0 | 0 | 0 | 0 | 0 | 0 | 0 | 0 |
|---|---|---|---|---|---|---|---|---|
| S1 | D3 | D3 | D2 | D2 | D2 | D1 | D1 | 1 |
| X | D6 | D6 | D5 | D5 | D5 | D4 | D4 | 1 |
| S3 | D9 | D9 | D8 | D8 | D8 | D7 | D7 | 1 |
| S4 | D12 | D12 | D11 | D11 | D11 | D10 | D10 | 1 |
| E7 | E6 | E5 | E4 | 0 | 1 | D13 | D13 | 1 |
| S6 | D15 | D15 | D14 | D14 | D14 | D13 | D13 | 1 |
| X | D18 | D18 | D17 | D17 | D17 | D16 | D16 | 1 |
| S8 | D21 | D21 | D20 | D20 | D20 | D19 | D19 | 1 |
| S9 | D24 | D24 | D23 | D23 | D23 | D22 | D32 | 1 |

FIG. 8(d)

| 0 | 0 | 0 | 0 | 0 | 0 | 0 | 0 | 0 |
|---|---|---|---|---|---|---|---|---|
| S1 | D6 | D5 | D4 | D3 | D2 | D1 | D1 | 1 |
| X | D12 | D11 | D10 | D9 | D8 | D7 | D7 | 1 |
| S3 | D18 | D17 | D16 | D15 | D14 | D13 | D13 | 1 |
| S4 | D24 | D23 | D22 | D21 | D20 | D19 | D19 | 1 |
| E7 | E6 | E5 | E4 | 1 | 1 | 0 | 0 | 1 |
| S6 | D30 | D29 | D28 | D27 | D26 | D25 | D25 | 1 |
| X | D36 | D35 | D34 | D33 | D32 | D31 | D31 | 1 |
| S8 | D42 | D41 | D40 | D39 | D38 | D37 | D37 | 1 |
| S9 | D48 | D47 | D46 | D45 | D44 | D43 | D43 | 1 |

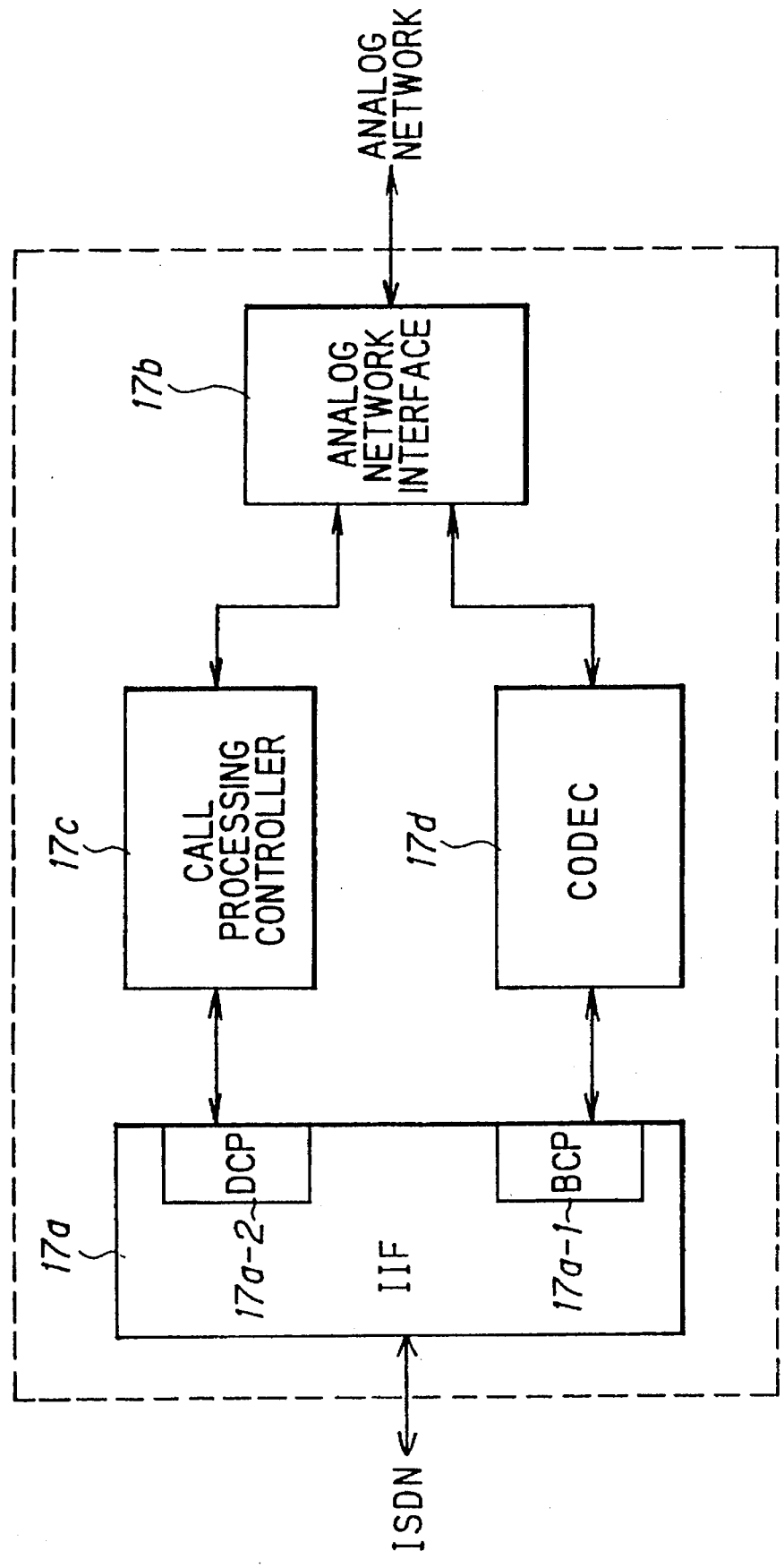

FIG. 13(a)

LNT

| NETWORK ACCOMMODATING TERMINAL COMMUNICATED WITH LAST |

FIG. 13(b)

| TELEPHONE NO. | CLASSIFICATION OF ACCOMMODATING NETWORK |
|---|---|
|  |  |
|  |  |
| - - - | - - - |

FIG. 13(c)

| DIAL SYSTEM | CLASSIFICATION OF ACCOMMODATING NETWORK |
|---|---|
|  |  |
|  |  |
|  |  |

5,572,524

DIGITAL-TRANSMISSION/ANALOG-TRANSMISSION CHANGEOVER APPARATUS

BACKGROUND OF THE INVENTION

This invention relates to an apparatus for changing over between digital transmission and analog transmission. More particularly, the invention relates to a digital-transmission/analog-transmission changeover apparatus in a communication system in which a digital transmission is performed between a digital terminal and a terminal accommodated by an ISDN, and an analog transmission is performed between a digital terminal and a terminal accommodated by an analog network via an ISDN and an analog network.

Though ISDNs (digital networks) have become widespread in recent years, analog networks still exist. As a consequence, there are cases in which a digital terminal accommodated by an ISDN (1) performs a digital communication with a terminal accommodated by an ISDN and (2) performs an analog communication, via an ISDN and analog network, with a terminal accommodated by an analog network. FIG. 15 is a diagram showing the configuration of a communication system according to the prior art, and FIG. 16 is block diagram illustrating the construction of a terminal adapter according to the prior art.

The communication system shown in FIG. 15 includes an ISDN 1, an analog network 2, a modem 3, a terminal 4 such as a host or telephone accommodated by the analog network, a terminal 5 such as a host or ISDN telephone accommodated by the ISDN, digital terminals 7, 7' of a personal computer or the like accommodated by the ISDN 1, a modem (modulator/demodulator) 8 for modulating digital data, which enters from the digital terminal, into analog data and demodulating an analog signal, which enters from a terminal adapter 9, into digital data, the terminal adapter (TA) 9, which has a digital interface and an analog interface, and a codec (coder/decoder) 10, which is an inter-network interface device provided between the ISDN and the analog network 2. The codec 10 converts 64 kb/s digital data entering from the ISDN 1 into an analog signal and converts the analog signal entering from the analog network 2 into 64 kb/s digital data (e.g., eight-bit data having a sampling frequency of 8 khz).

As shown in FIG. 16, the terminal adapter 9 has a digital interface (DIF) 9a, an analog interface (AIF) 9b, an ISDN interface (IIF) 9c, a digit detector (DLD) 9d for detecting a party's telephone number or the like, a processor (CPU) 9e for executing call processing control, a rate converter (VCT) 9f and a PCM converter (also referred to as a codec) 9g.

The digital interface 9a provides an interface for connecting a digital terminal, and the analog interface 9b provides an interface for connecting a modem or an analog terminal.

The ISDN interface 9c, which is connected to the ISDN 1 in line with a basic rate interface (so-called 2B+D) or first group rate interface (so-called 23B+D) advised by the CCITT, has a B-channel processor (BCP) 9h and a D-channel processor (DCP) 9i. The basic rate interface has two information channels referred to as "B channels" having a transmission rate of 64 kb/s, and one channel, referred to as a "D" channel, for both control signals and information, having a transmission rate of 16 kb/s, for a total of three multiplexed channels.

The rate converter 9f, which is in accordance with advisory V110/V120, etc., of the CCITT, converts the rate (user data rate) of data entering from the digital terminal to the rate (64 kb/s) conforming to the ISDN, and converts the rate (64 kb/s) of data entering from the ISDN to the user data rate. More specifically, the rate converter 9f converts digital data of various rates entering via the digital interface 9a into digital data of 64 kilobits per second in accordance with a predetermined rate matching procedure and sends the digital data to a B channel of the ISDN 1 via the ISDN interface 9c. Further, therate converter 9f converts 64 kb/s digital data entering via the ISDN interface 9c into digital data, which is capable of being received by a digital terminal, in accordance with the above-mentioned rate matching procedure, and sends the digital data to a digital terminal via the digital interface 9a.

The PCM converter 9g converts an analog signal entering via the analog interface 9b into digital data having a rate (64 kb/s) conforming to the ISDN, and sends this digital data to a B channel of the ISDN 1 via the ISDN interface 9b. Further, the PCM converter 9g converts 64 kb/s digital data entering from the ISDN via the ISDN interface 9c into an analog signal and enters the analog signal in the analog interface 9b.

Digital Transmission

In a case where a digital transmission is performed with the terminal 5 accommodated by the ISDN 1, the digital terminal 7 is connected to a digital terminal Td of the terminal adapter 9. Next, when an outgoing call is placed by entering the telephone number of the digital terminal 5 from the digital terminal 7, the call processing controller 9e of the terminal adapter 9 accepts the data (the called party's telephone number, the bearer capability, etc.) sent from the digital terminal 7 and executes the following call processing control: First, the call processing controller 9e sends a SET-UP message (a call set-up request message) to the ISDN 1 via the D-channel processor 9i. FIG. 17 is a diagram for describing the call control procedure in the ISDN. The procedure will be described in accordance with FIG. 17.

When receiving the SET-UP message, the ISDN sends a CALL-PROC message (notification that processing is in progress for setting up a call) to the call processing controller 9e and sends the SET-UP message to the terminating terminal (assumed here to be an ISDN terminal) 5. When call set-up processing ends, the terminating terminal 5 issues a ring-back tone and sends an ALERT message (notification that the called party has been called) to the originating side via the ISDN. If the called party subsequently responds by picking up the telephone receiver (taking the receiver off the hook), the terminating terminal 5 sends a CONN message (response notification) to the ISDN. As a result, the ISDN sends a CONN-ACK message (notification of acknowledgment) to the terminating terminal 5 and sends the CONN message to the call processing controller 9e. Thus, the B channels of the two terminals are connected to make communication possible.

Next, the digital data outputted by the digital terminal 7 is converted into 64 kb/s digital data by the rate converter 9f and this data is then sent to a B channel of the ISDN 1 upon having prescribed control data attached thereto.

When communication ends and the telephone receiver of the terminating terminal 5 is returned (placed on the hook), the terminating terminal outputs a DISC message (a disconnect request) to the ISDN. The ISDN sends the DISC message to the call processing controller 9e, disconnects the channel, releases the called number and sends a REL message (completion of channel disconnection and a request to release the called number) to the terminating terminal 5. The terminating terminal 5 releases the called number in response to reception of the REL message and sends a REL-COPM message (notification of channel disconnection and of completion of release of called number) to the ISDN. Upon receiving the DISC message, the call processing controller 9e releases the called number and sends a REL message to the ISDN. In response to reception of the REL message, the ISDN releases the channel and the called number and sends a REL-COPM message to the call processing controller 9e to end call control.

Analog Transmission

In a case where an analog transmission is performed, via the ISDN 1, with the terminal 4 accommodated by the analog network 2, the digital terminal 7' is connected to an analog terminal Ta of the terminal adapter 9 via the modem 8. Next, when an outgoing call is placed by entering the telephone number of the terminal 4 from the digital terminal 7', the call processing controller 9e of the terminal adapter 9 accepts the data (the called party's telephone number, etc.), which is sent from the digital terminal 7', via the digit detector 9d and executes call processing control. First, the call processing controller 9e sends the SET-UP message to the ISDN 1 via the D-channel processor 9i. Thereafter, in a manner similar to that described above, communication is made possible by establishing a link, in accordance with the call control procedure, among the call processing controller 9e, ISDN 1 and inter-network interface 10.

Thereafter, the digital data outputted by the digital terminal 7' is modulated into an analog signal by the modem 8 and the analog signal is entered in the PCM converter 9g of the terminal adapter 9. The PCM converter 9g converts the entered analog signal into 64 kb/s digital data and sends the digital data to a B channel of the ISDN 1. This data arrives at the inter-network interface 10 via the ISDN. The interface 10 converts the 64 kb/s digital data into an analog signal, and the analog signal is received by the terminal 4, such as a host, via the analog network 2 and modem 3. When communication ends, the channel is released through a procedure similar to that described above.

The conventional terminal adapter 9 has the digital interface for digitally transmitting a digital input, and the analog interface for transmitting an analog input in analog fashion. However, there is no analog interface for transmitting a digital input in analog fashion. Consequently, when it is necessary to communicate with both a terminal accommodated by an ISDN and a terminal accommodated by an analog network, the two digital terminals 7, 7' must be provided, as shown in FIG. 15, and the modem 8 is required to provide matching for the analog interface. A problem that arises is higher cost.

Further, the user must select which of the two digital terminals 7, 7' to use upon determining whether the party to be called is accommodated by an analog network or an ISDN. This is a troublesome operation.

SUMMARY OF THE INVENTION

Accordingly, a first object of the present invention is to provide a digital-transmission/analog-transmission changeover apparatus through which data communication with a terminal accommodated by an analog network and a terminal accommodated by an ISDN can be performed by a single digital terminal and without requiring a modem.

A second object of the present invention is to provide a digital-transmission/analog-transmission changeover apparatus through which communication can be performed without a user needing to know whether the terminal of the communicating party is accommodated by the analog network or the ISDN.

A third object of the present invention is to provide a digital-transmission/analog-transmission changeover apparatus through which data can be received by a single digital terminal through digital transmission and analog transmission from both a terminal accommodated by the analog network and a terminal accommodated by the ISDN.

In accordance with the present invention, the first object is attained by providing a digital-transmission/analog-transmission changeover apparatus comprising a rate converter for converting the rate of data, which has entered from the digital terminal, to a rate suited to the ISDN, and for converting the rate of data, which has entered from the ISDN, to the rate of the digital terminal, a modulator/demodulator for modulating digital data, which has entered from the digital terminal, into an analog signal and demodulating an analog signal into digital data, a PCM converter connected to the modulator/demodulator for converting the analog signal, which has entered from the modulator/demodulator, into digital data at a rate suited to the ISDN, and converting digital data from the ISDN into an analog signal and entering the analog signal in the modulator/demodulator, an ISDN communication controller connected to the rate converter and the PCM converter for performing communication control in accordance with an ISDN protocol, and a connecting unit for selectively connecting the digital terminal to the rate converter or modulator/demodulator.

In accordance with the present invention, the second object is attained by providing a digital-transmission/analog-transmission changeover apparatus comprising a call controller for making information, which is contained in a SET-UP message for call set-up and indicates the distinction between an analog and a digital transmission, "digital" in a case where a digital terminal is connected to a rate converter, making information, which is contained in a SET-UP message for call set-up and indicates the distinction between the analog transmission and the digital transmission, "analog" in a case where the digital terminal is connected to a modulator/demodulator, changing the above-mentioned information contained in the SET-UP message from "digital" to "analog" in response to an incoming-call refusal sent from the ISDN in a case where the above-mentioned information is "digital" and the called party's terminal is accommodated by the analog network, and changing the above-mentioned information contained in the SET-UP message from "analog" to "digital" in response to refusal of an incoming-call sent from the ISDN in a case where the above-mentioned information is "analog" and the called party's terminal is accommodated by a digital network, and a connection controller for changing the connection destination of the digital terminal in refusal of the incoming-call.

In accordance with the present invention, the third object is attained by providing a digital-transmission/analog-transmission changeover apparatus which, when a call is terminated, connects the digital terminal to the rate converter in a case where information contained in a SET-UP message is "digital" and connects the digital terminal to the modulator/demodulator in a case where the information contained in the SET-UP message is "analog".

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram for describing the composition of a frame at an intermediate rate;

FIGS. 8(a)~8(d) are diagrams of frame composition in cases where rate of data from a digital terminal is 600, 1200, 2400, 4800 b/s, respectively;

FIG. 9 is a block diagram of an inter-network interface device;

FIG. 13(a) is an explanatory view illustrating an example in which a network accommodating a terminal communicated with last is stored in memory;

FIG. 13(b) is a diagram for describing the relationship between telephone numbers and classification of accommodating networks;

FIG. 13(c) is a diagram for describing the relationship between dialing systems and classification of accommodating networks;

DESCRIPTION OF THE PREFERRED EMBODIMENTS (a) General Features of the Invention

Figure 1:
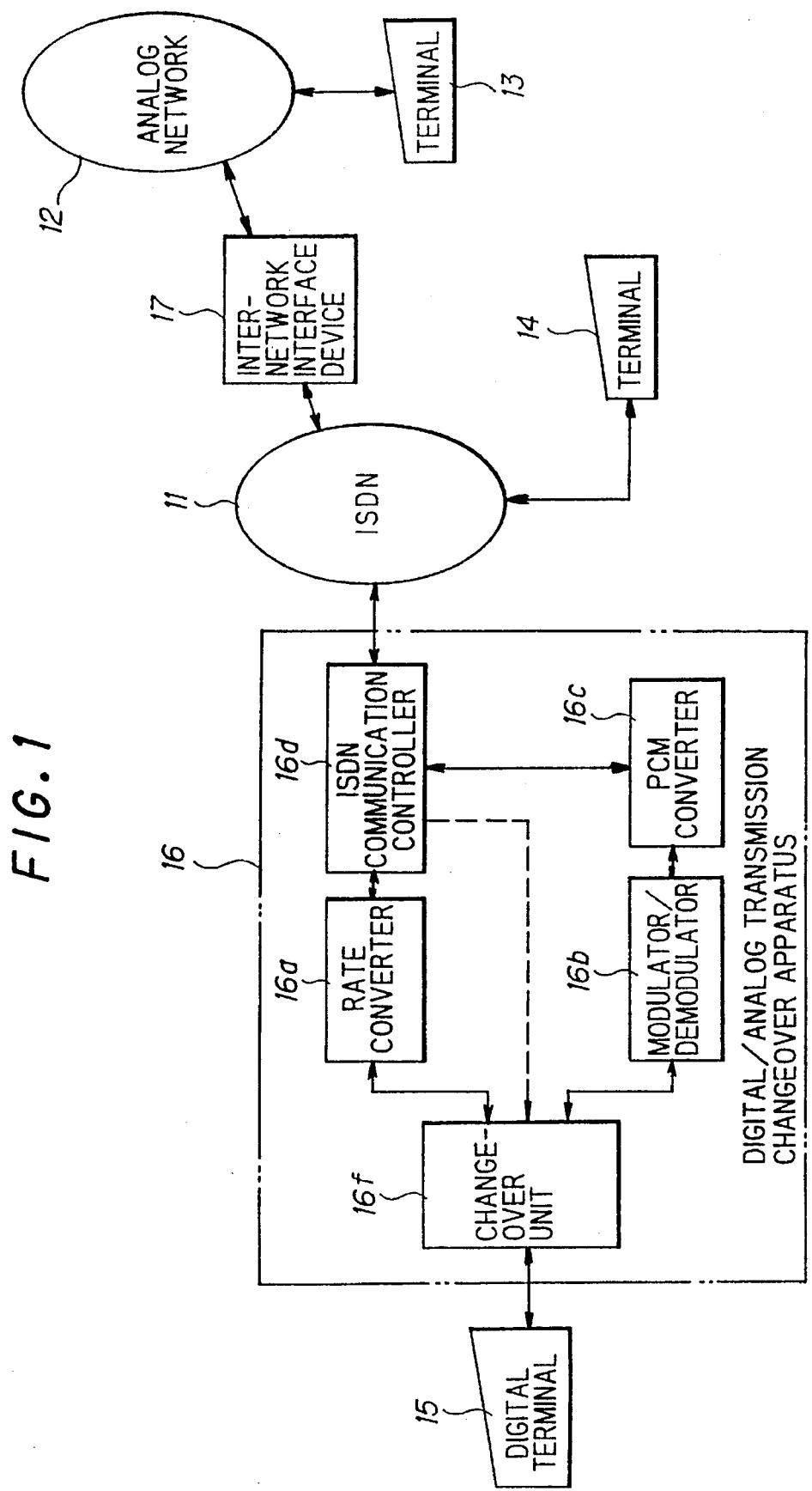
FIG. 1 is a diagram for describing the general features of the present invention.

Shown in FIG. 1 are an ISDN 11, an analog network 12, a terminal 13 such as a host or telephone accommodated by the analog network, a terminal 14 such as a host or ISDN telephone accommodated by the ISDN 11, a digital terminal 15 of a personal computer or the like accommodated by the ISDN 11, a digital-transmission/analog-transmission changeover apparatus 16, and an inter-network interface device 17. The digital-transmission/analog-transmission changeover apparatus 16 includes a rate converter 16a for digital transmission, a modulator/demodulator 16b for analog transmission, a PCM converter 16c (codec) connected to the modulator/demodulator 16b, an ISDN communication control unit 16d connected to the rate converter 16a and PCM converter 16c for performing communication control in accordance with an ISDN protocol, and a changeover unit 16f for selectively connecting the digital terminal 15 to the rate converter 16a and modulator/demodulator 16b.

In a case where the digital terminal 15 performs communication with the terminal 14 accommodating by the ISDN 11, the digital terminal 15 is connected to the rate converter 16a. In a case where the digital terminal 15 performs communication with the terminal 13 accommodated by the analog network 12, the digital terminal 15 is connected to the modulator/demodulator 16b. Thus, the digital terminal 15 is capable of performing a digital transmission or analog transmission. If this arrangement is adopted, data can be communicated with a terminal accommodated by the analog network and ISDN by a single digital terminal and without requiring a modem for the desital terminal.

In a case where the digital terminal 15 is connected to the rate converter 16a, the ISDN communication control unit 16d makes information (bearer capability) "digital". This information is contained in a set-up message (SET UP) for setting up a call and indicates the distinction between analog transmission and digital transmission. In a case where the digital terminal 15 is connected to the modulator/demodulator 16b, the ISDN communication control unit 16d makes the bearer capability "analog". In a case where the bearer capability contained in the SET-UP message is "digital" and the called party's terminal is accommodated by the analog network, and in a case where the bearer capability is "analog" and the called party's terminal is accommodated by the digital network, the ISDN 11 sends refusal of an incoming-call to the ISDN communication control unit 16d. In refusal of the incoming-call, the ISDN communication control unit 16d controls the changeover unit 16f to change over the destination to which the digital terminal 15 is connected, changes the bearer capability contained in the SET-UP message from "digital" to "analog" or from "analog" to "digital". Thus, the user is capable of performing communication without needing to know whether the communicating party's terminal is accommodated by the analog network or by the ISDN.

Furthermore, at the time of an incoming call, the ISDN communication control unit 16d connects the digital terminal 15 and the rate converter 16a in a case where the bearer capability contained in the SET-UP message is "digital" and connects the digital terminal 15 and the modulator/demodulator 16b in a case where the bearer capability is "analog". Thus, data is capable of being received by a single digital terminal by a digital transmission and an analog transmission from both a terminal accommodated by an analog network and a terminal accommodated by an ISDN.

(b) Configuration of Communication System of the Invention

Figure 2:
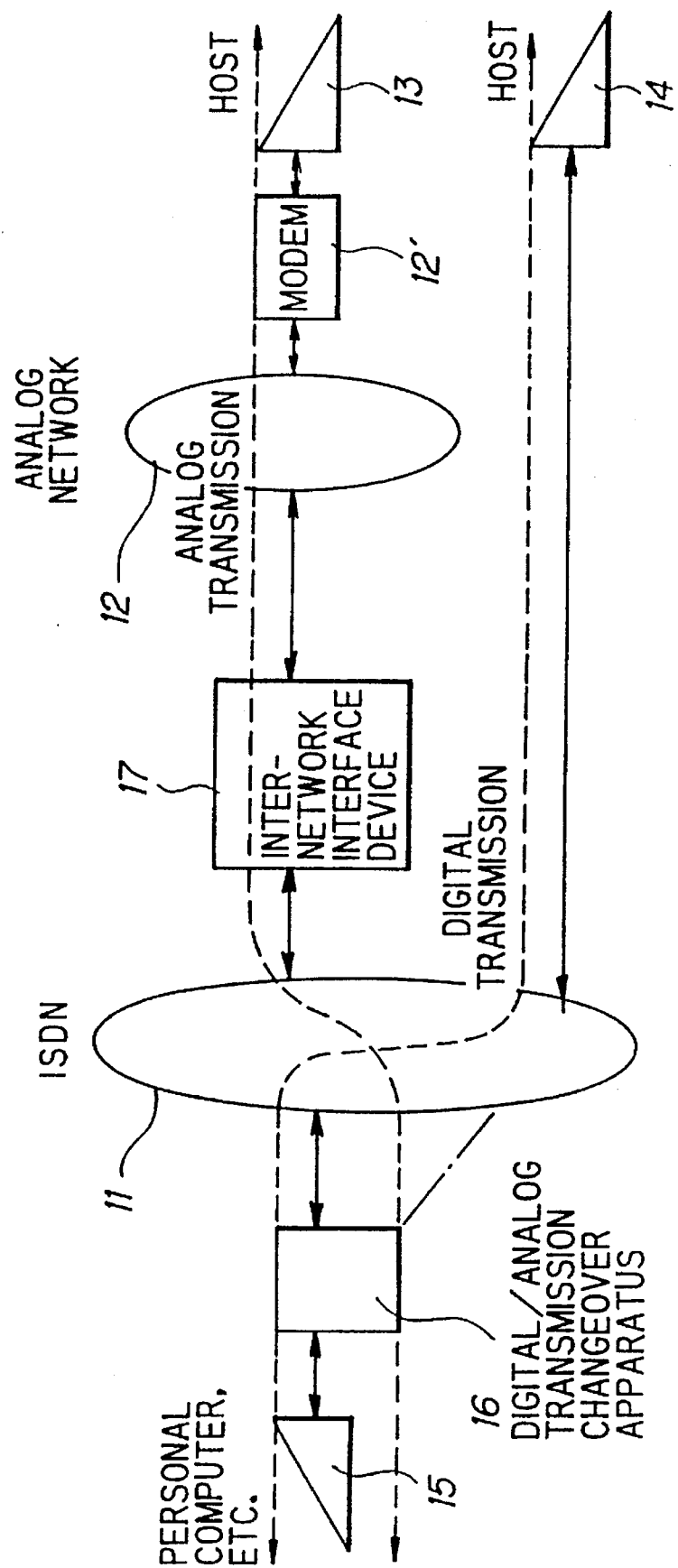
FIG. 2 is a diagram showing the configuration of a communication system according to the present invention.

FIG. 2 is a diagram showing the configuration of a communication system which includes the digital-transmission/analog-transmission changeover apparatus according to the present invention.

The system of FIG. 2 includes the ISDN 11, the analog network 12, a modem 12', the terminal 13 such as a host or telephone accommodated by the analog network, the terminal 14 such as the host or ISDN telephone accommodated by the ISDN 11, the digital terminal 15 of the personal computer or the like accommodated by the ISDN 11, the digital-transmission/analog-transmission changeover apparatus 16, and the inter-network interface device 17.

Construction of Digital Terminal

Figure 3:
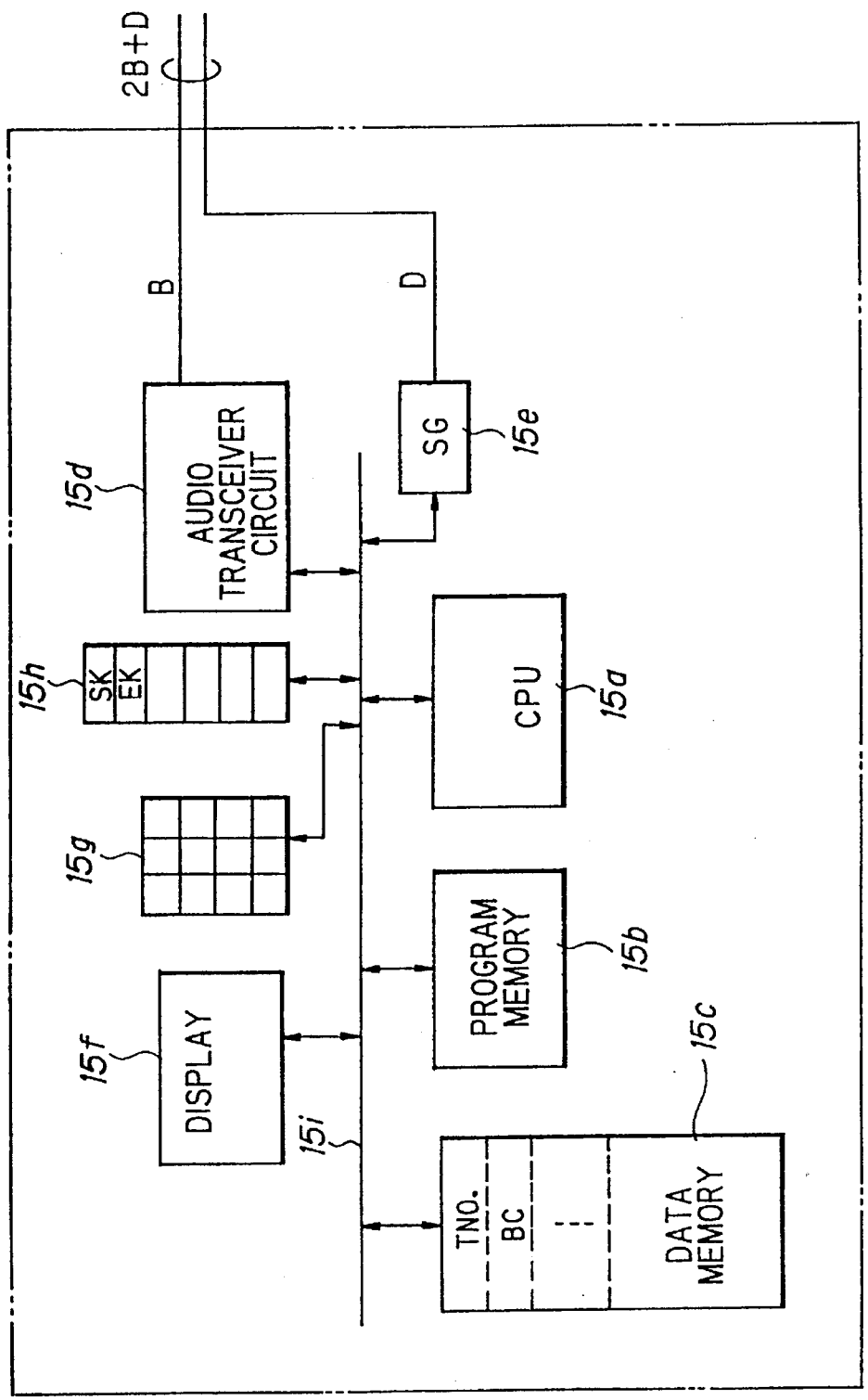
FIG. 3 is a block diagram of a digital terminal.

The digital terminal (ISDN terminal) has the construction shown in FIG. 3, by way of example. Specifically, the digital terminal includes a processor (CPU) 15a for overall control of the terminal, a program memory 15b, a data memory 15c, an audio transceiver circuit 15d, a signal terminating circuit 15e of a D channel, a display 15f, a numeric key pad 15g, and a function-key unit 15h for entering various data. These components are interconnected via a bus line 15i. A prescribed storage area of the data memory 15c stores various data, such as a subscriber number TNO and bearer capability (BC), placed in the SET-UP message and transmitted at the time of call control. The audio transceiver circuit 15d is provided with a telephone receiver, an audio controller for performing a conversion between an analog signal (a voice, etc.) and digital data, and an interface controller. These components, however, are not shown. The function-key unit 15h is provided with a send key (SK), an end key (EK), etc.

Digital-Transmission/Analog-Transmission Changeover Apparatus

Figure 4:
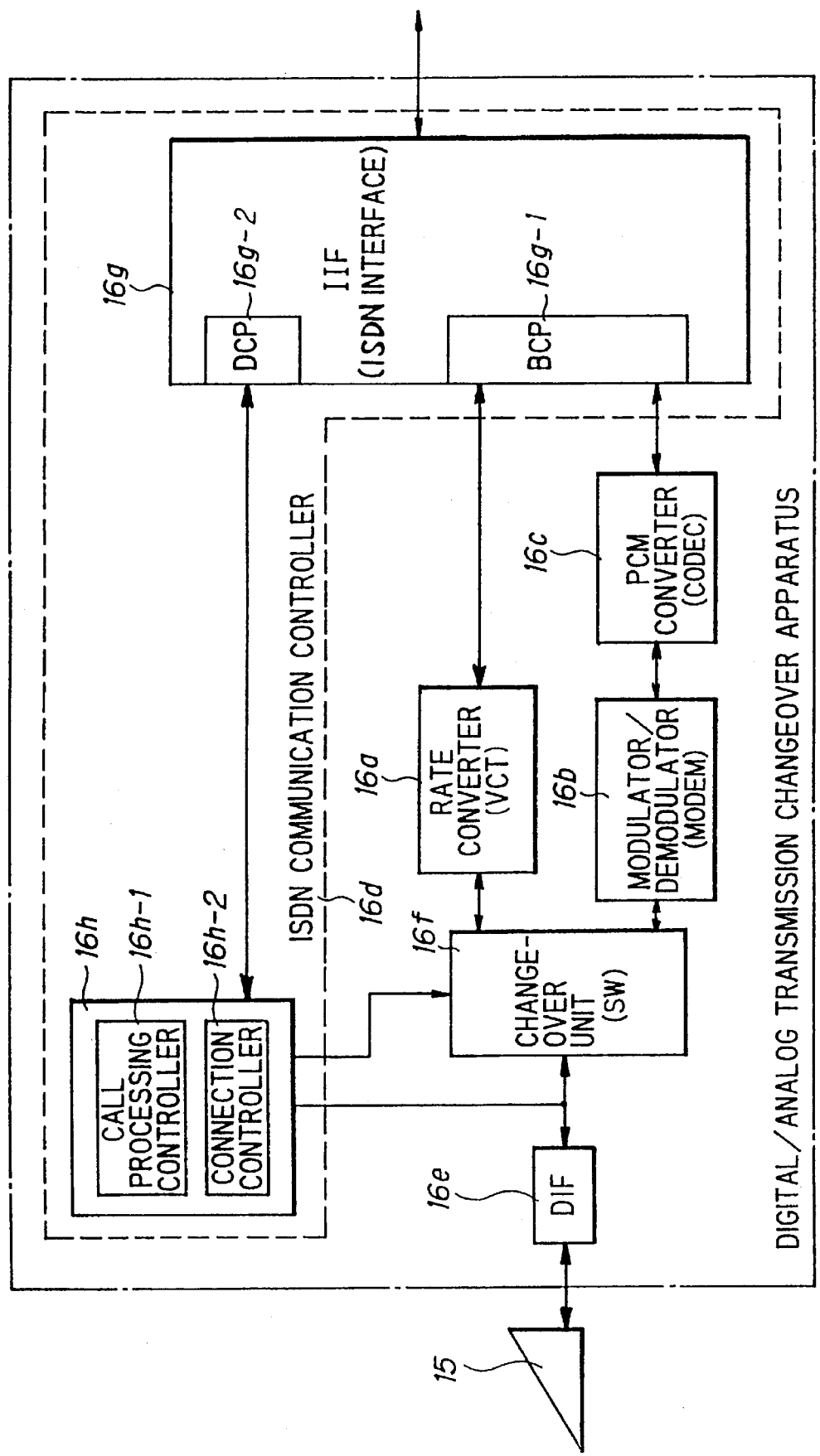
FIG. 4 is a block diagram of a digital-transmission/ analog-transmission changeover apparatus.

The construction of the digital-transmission/analog-transmission changeover apparatus 16 is shown in FIG. 4. Numeral 16a denotes the rate converter (VCT) for converting the rate of data entering from the digital terminal to the rate (64 kb/s) suited to the ISDN and converting the rate of data entering from the ISDN to the rate of the digital terminal. Numeral 16b denotes the modulator/demodulator (MODEM) for modulating digital data, which enters from the digital terminal, into an analog signal and demodulating an analog signal into digital data. Numeral 16c denotes the PCM modulator (CODEC) for converting an analog signal entering from the modulator/demodulator 16b into digital data having a rate suited to the ISDN and converting digital data from the ISDN into an analog signal and then inputting the analog signal to the modulator/demodulator. It should be noted that the A/D conversion is performed by making a conversion into eight-bit data at a sampling frequency of 8 KHz. Numeral 16d denotes the ISDN control unit connected to the rate converter 16a and PCM converter 16c for performing communication control in accordance with an ISDN protocol. Numeral 16e denotes a digital interface (DIF) and 16f a changeover unit (SW) for selectively connecting the digital terminal to the rate converter 16a or modulator/demodulator 16b.

The ISDN communication control unit 16d includes an ISDN interface (IIF) 16g and a processor 16h, which has a call processing controller 16h-1 and a connection controller 16h-2. The latter performs control for connecting the digital terminal to the rate converter or modulator/demodulator. In a case where communication is to be performed with a terminal accommodated by the ISDN, the connection controller 16h-2 causes the digital terminal 15 to be connected to the rate converter 16a by the changeover unit 16f. In a case where communication is to be performed with a terminal accommodated by the analog network, the connection controller 16h-2 causes the digital terminal 15 to be connected to the modulator/demodulator 16b by the changeover unit 16f. The ISDN interface 16g, which is connected to the ISDN 1 in line with the basic rate interface (so-called 2B+D) or first group rate interface (so-called 23B+D) advised by the CCITT, has a B-channel processor (BCP) 16g-1 and a D-channel processor (DCP) 16g-2.

Rate Converter

Figures 5, 6:
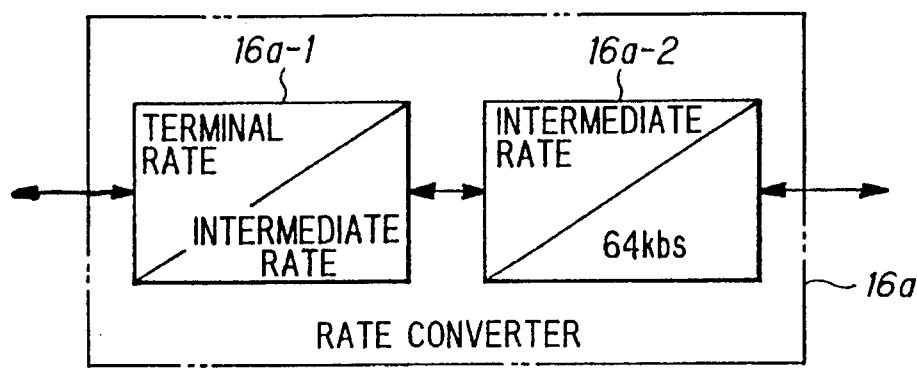
FIG. 5 is a block diagram of a rate converter.
FIG. 6 is a diagram for describing intermediate rates.

The rate converter 16a converts the rate (user data rate) of data entering from the digital terminal to 64 kb/s and converts 64 kb/s data entering from the ISDN to the rate of the digital terminal. As shown in FIG. 5, the rate converter 16a has a first rate converting section 16a-1 for converting the user data rate to an intermediate rate and vice versa, and a second rate converting section 16a-2 for converting intermediate-rate data to 64 kb/s data and vice versa.

As illustrated in FIG. 6, the first rate converting section 16a-1 makes a conversion to intermediate-rate data of 8 kb/s in a case where the user data rate is 600– 4800 b/s, to intermediate-rate data of 16 kb/s in a case where the user data rate is 7200 and 9600 b/s, to intermediate-rate data of 32 kb/s in a case where the user data rate is 12000, 14400 and 19200 b/s. Further, the intermediate-rate data is converted into data having a rate conforming to the terminal.

Data at the intermediate rate has the frame structure shown in FIG. 7. One frame is composed of 80 bits (10 octets), in which all of the bits of Octet No. 0 are 0. For Octet No. 5, the first bit is 1 and all other bits are E bits. The E bits are used in identifying user data rate. As for Octet Nos. 1–4 and 6–9, the first bit is 1, the eighth bit is a status bit (S or X), and the second through seventh bits are data bits (D).

A 17-bit frame synchronization pattern is formed by the eight 0s of Octet No. 0 and the nine 1s of the first bits of the first through ninth octets. The status bits (S1, S3, S4, S6, S8, S9, X are used in order to send channel control information.

FIGS. 8(a), 8(b), 8(c) and 8(d) are diagrams of frame composition in cases where the user data rate is 600, 1200, 2400 and 4800 b/s, respectively. In a case where the user data rate is 600 b/s, six (=600·80/8000) items of user data D1~D6 are each transmitted, in multiplexed fashion, eight times per frame (=80 bits). In a case where the user data rate is 1200 b/s, 12 (=1200·80/8000) items of user data D1~D12 are each transmitted, in multiplexed fashion, four times per frame. Similarly, 24 items of user data D1~D24 are each transmitted, in multiplexed fashion, two times per frame in a case where the user data rate is 2400 b/s, and 48 items of user data D1~D48 are transmitted per frame in a case where the user data rate is 4800 b/s.

The second rate converting section 16a-2 converts intermediate-rate data into 64 kb/s data, and vice versa, by a technique similar to that employed by the first rate converting section 16a-1.

Inter-network Interface Device

The inter-network interface device 17 has the construction shown in FIG. 9. More specifically, the interface device 17 includes an ISDN interface 17a, an analog-network interface 17b, a call processing controller 17c for performing call processing control in place of a terminal accommodated by an analog network, and a PCM converter (CODEC) 17d for converting digital data from the ISDN into an analog signal and converting an analog signal from the analog network into digital data having a rate (64 kb/s) suited to the ISDN. (By way of example, the A/D conversion is performed by making a conversion into eight-bit data at a sampling frequency of 8 KHz). The ISDN interface 17a has a B-channel processor (BCP) 17a-1 and a D-channel processor (DCP) 17a-2.

ISDN Exchange

Figure 10:
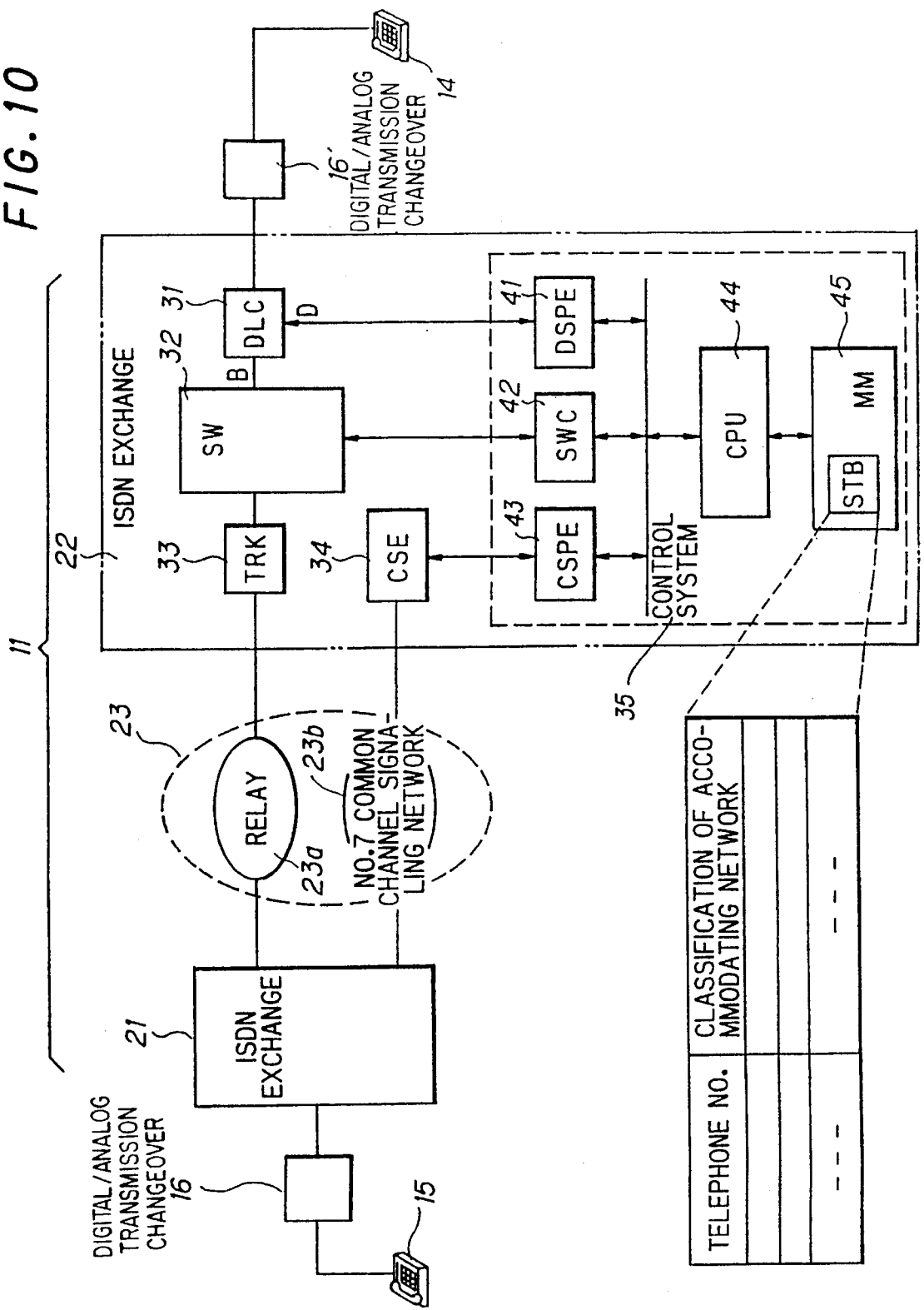
FIG. 10 is a diagram showing the configuration of an ISDN exchange.

FIG. 10 is a diagram showing the configuration of an ISDN exchange accommodating a subscriber. Shown in FIG. 10 are the ISDN network 11, the ISDN terminals 14, 15, digital-transmission/analog-transmission changeover apparatus 16, 16', and ISDN exchanges 21, 22 to which subscribers are connected. Numeral 23 denotes part of the ISDN network other than that for the ISDN exchanges 21, 22. Numeral 23a denotes a relay and 23b a No. 7 common channel signaling network. In the ISDN signaling system, a digital subscriber signaling system 1 (DSS-1) is applied to a subscriber line section, and a No. 7 common channel signaling system is applied to an inter-office trunk line section.

The ISDN exchange 22 includes a digital subscriber's line interface circuit DLC 31, a switch circuit network SW for switching 64 Kbit/sec digital information, a digital trunk (TRK) 33, common channel signaling equipment (CSE) 34 for sending and receiving common channel signals between the ISDN exchange and the No. 7 common channel signaling network, and a control system 35. The control system 35 includes a DSS-1 signal processor (DSPE) 41, a switch controller (SWC) 42, a No. 7 common channel signal processor (CSPE) 43, a central processing unit (CPU) 44, and a main memory (MM) 45. The classification of the accommodating network is registered in the main memory 45 in correspondence with the telephone number of the subscriber. The classification indicates whether the terminal is accommodated by the analog network or by the ISDN.

Transmission Control

Digital transmission and analog transmission are performed by connecting the digital terminal 15 to the rate converter 16a if it is to communicate with the terminal 14 accommodated by the ISDN 11, and to the modulator/demodulator 16b if it is communicate with the terminal 13 accommodated by the analog network 12.

(1) Digital Transmission

Figure 17:
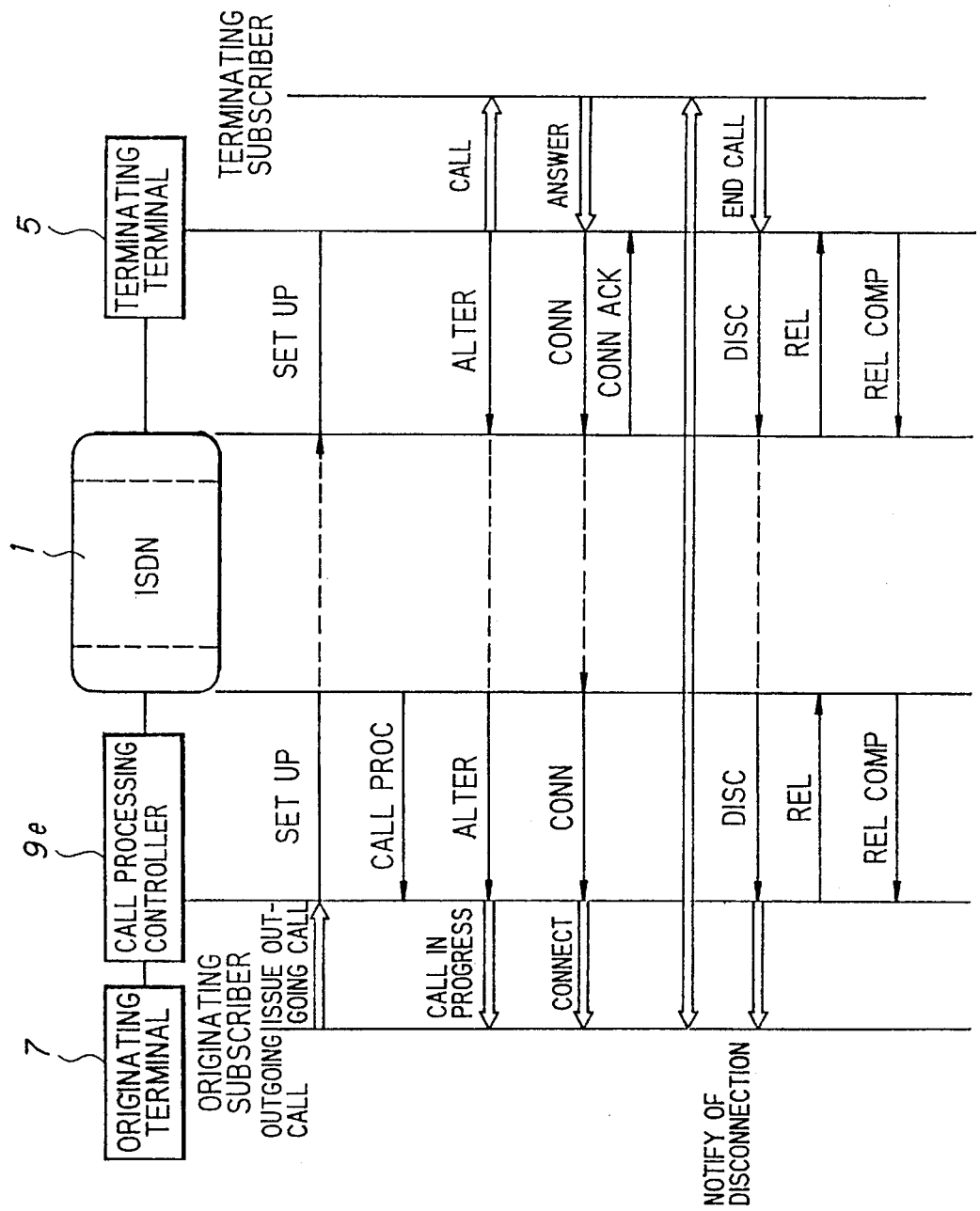
FIG. 17 is a diagram for describing a call control procedure in an ISDN according to the prior art.

In case of digital transmission, the digital terminal 15 is connected to the rate converter 16a by the changeover unit 16f (see FIG. 4). When an outgoing call is placed by entering the telephone number of the terminal 14 from the digital terminal 15 under these conditions, the call processing controller 16h-1 executes call control processing in accordance with the call control procedure shown in FIG. 17, thereby enabling communication between the two terminals. Thereafter, data entered from the digital terminal 15 is subjected to a rate conversion by the rate converter 16a, and the resulting data enters the ISDN interface 16g. Here the data is converted into an ISDN format and sent to the ISDN 11, whence the data is digitally transmitted to the terminal 14.

(2) Analog Transmission

In case of analog transmission, the digital terminal 15 is connected to the modulator/demodulator 16b by the changeover unit 16f. When an outgoing call is placed by entering the telephone number of the terminal 13 from the digital terminal 15 under these conditions, communication between the two terminals is enabled in a manner similar to that described above. Thereafter, data entered from the digital terminal 15 is modulated into an analog signal by the modulator/demodulator 16b and the analog signal is fed into the PCM converter 16c. Here the analog signal is converted in a 64 kb/s digital signal. This signal is converted into the ISDN format in the ISDN interface 16g, whence the signal is transmitted to the ISDN 11, which inputs the signal to the inter-network interface device 17. The PCM converter (CODEC) 17d of the inter-network interface device 17 converts the 64 kb/s digital data into an analog signal and inputs this analog signal to the analog network 12. Thereafter, the analog signal is transmitted, in analog fashion, to the terminal 13 via the analog network 12 or modem 12'.

In this case, the user is capable also of changing over a switch SW (not shown) of the changeover unit 16f manually in dependence upon the transmission is digital or analog. In manual changeover, however, operability is poor because the user must be aware of whether the terminal of the communicating party is accommodated in the analog network or the ISDN before making the changeover. Accordingly, it is necessary to switch the changeover unit 16f automatically in dependence upon whether the transmission is digital or analog.

Automatic Changeover Control

Figure 11:
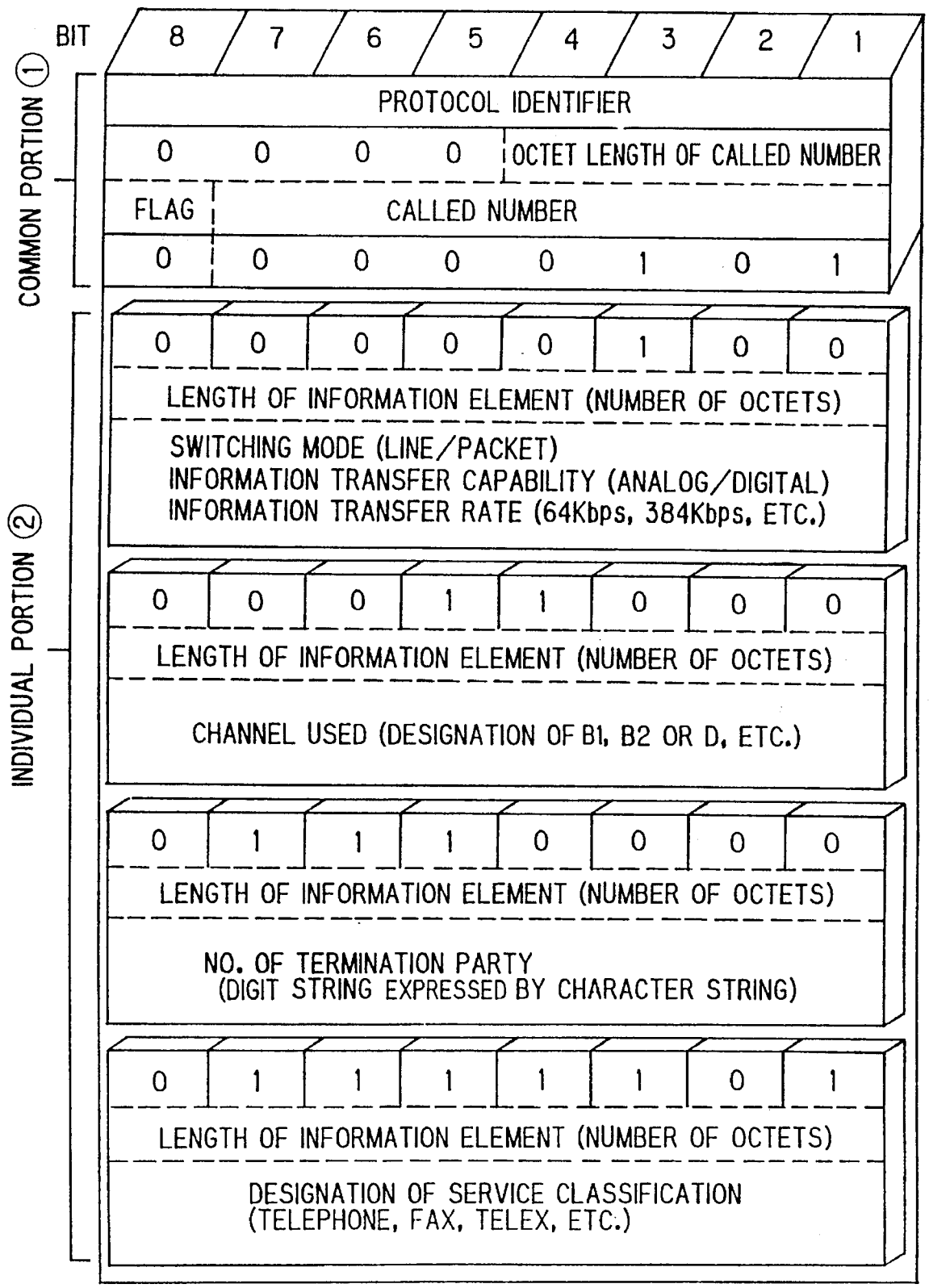
FIG. 11 is a diagram for describing the composition of a SET-UP message.

When a call is set up, the SET-UP message for this purpose is sent to the ISDN from the call processing controller 16h-1 of the ISDN communication control unit 16d. The SET-UP message, which is for transferring such information as the various numbers and desired communication mode required to start communication, has the composition shown in FIG. 11. Specifically, the SET-UP message is broadly divided into a common portion ① and an individual portion ②. The common portion ① includes a protocol identifier, the octet length of the called number, the called number and the SET-UP message type. The individual portion ② includes the switching mode (line/packet), the information transfer capability (analog/digital), the information transfer rate (64 kbps/384 kbps, etc.), the channel used, the number of the terminating party, the service classification, etc.

By using the information transfer capability (bearer capability), which is contained in the SET-UP message and indicates whether transmission is digital or analog, the connection controller 16h-2 is capable of switching the changeover unit 16f automatically, as will be described later. The originating procedure and terminating procedure will now be described.

(a) Originating Procedure

Figure 12:
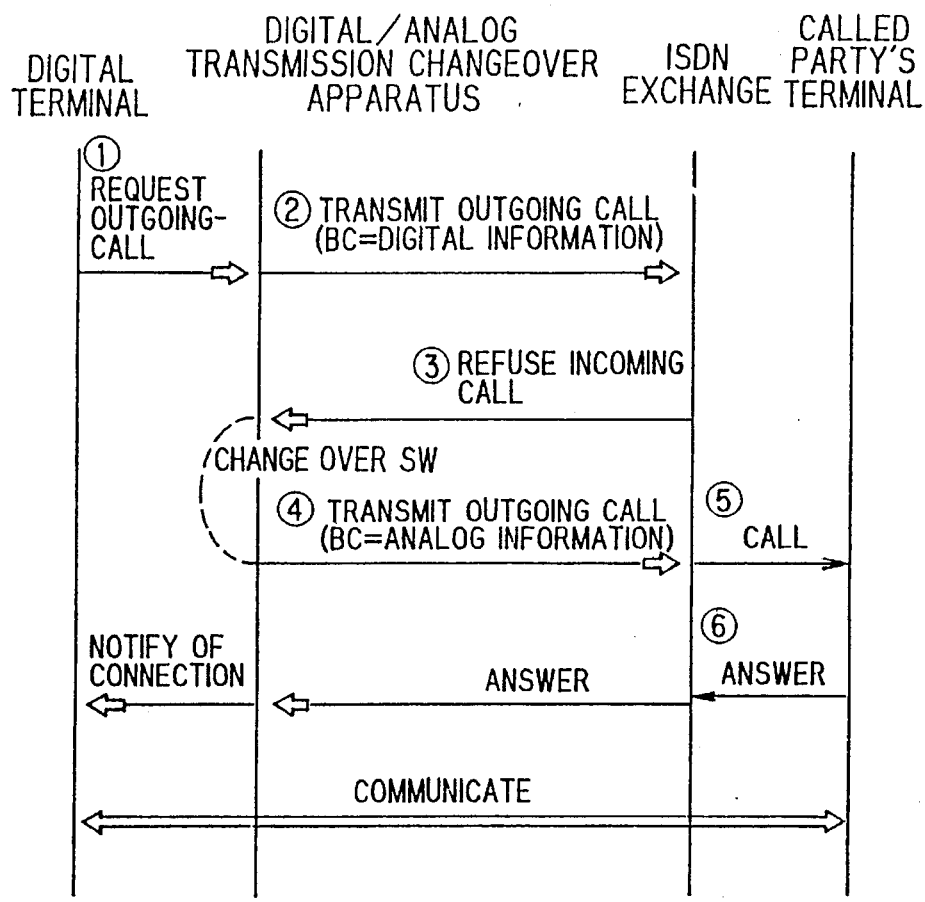
FIG. 12 is a diagram for describing a call originating procedure.

FIG. 12 is a diagram for describing a call originating procedure. It will be assumed that the connection controller 16h-2 controls the changeover unit 16f to connect the digital terminal 15 to the rate converter 16a.

① When a request for an outgoing call is issued by entering the telephone number of the party's terminal 13 (accommodated by the analog network) from the digital terminal 15, ② the call processing controller 16h-1 of the digital-transmission/analog-transmission changeover apparatus 16 makes the bearer capacity BC "digital" and sends the SET-UP message for setting up the call to the ISDN 11.

③ The SET-UP message is transferred within the ISDN 11 and arrives at the subscriber's ISDN exchange accommodating the terminal 13. Using the telephone number of the terminating party, the ISDN exchange refers to a subscriber's table STB, which has been stored in the memory 45, and determines whether the terminal 13 is accommodated by the ISDN or by the analog network. If the party's terminal is accommodated in the analog network, the ISDN exchange refuses the incoming call and sends the incoming-call refusal message to the digital-transmission/analog-transmission changeover apparatus 16. If the party's terminal is accommodated in the ISDN, on the other hand, the incoming call is not refused and the call is placed.

④ If the connection controller 16h-2 of the digital-transmission/analog-transmission changeover apparatus 16 receives the incoming-call refusal, the controller controls the changeover unit 16f to connect the digital terminal 15 to the modulator/demodulator 16b, and the call processing controller 16h-1 changes the bearer capability BC from "digital" to "analog" and sends the SET-UP message to the ISDN again.

⑤ Since the bearer capability BC is "analog" and the network accommodating the party's terminal is the analog network, the ISDN exchange on the side of the subscriber calls the party's terminal without refusing the incoming call.

⑥ If the terminal 13 answers the call, the ISDN exchange gives notice of the answer to the call processing controller 16h-1 of the digital-transmission/analog-transmission changeover apparatus 16, and the controller 16h-1 gives notice of connection to the digital terminal 15 to enable communication.

In summary, therefore, the call processing controller 16h-1 makes "digital" the bearer capability BC contained in the SET-UP message for call set-up if the digital terminal 15 is connected to the rate converter 16a. If the terminal 15 is connected to the modulator/demodulator 16b, however, the call processing controller 16h-1 makes the bearer capability BC "analog". In a case where bearer capability BC is "digital" and the terminating terminal is accommodated by the analog network, and in a case where the bearer capability BC is "analog" and the terminating terminal is accommodated by the digital network, the ISDN exchange sends notice of refusal of the incoming-call to the digital-transmission/analog-transmission changeover apparatus 16. When the connection controller 16h-2 receives refusal of the incoming-call, the connection of the digital terminal 15 is changed from the rate converter 16a to the modulator/demodulator 16b or from the modulator/demodulator 16b to the rate converter 16a by the changeover unit 16f. Further, the call processing controller 16h-1 changes the bearer capability BC from "digital" to "analog" or from "analog" to "digital" and sends the SET-UP message to the ISDN again. By adopting this arrangement, a modem is no longer necessary. Moreover, data communication can be performed by terminating a call at the party's terminal by a single call originating opportunity at a single digital terminal without the user needing to know whether the party's terminal is accommodated by an analog network or a digital network.

The foregoing is for a case where an outgoing call is placed to the terminal 13 accommodated by the analog network. However, a similar operation would be performed if an outgoing call were placed to the terminal 14 accommodated by the ISDN.

Modification of Control for Deciding Connection Destination (1) In the foregoing, it was assumed that the initial connection was between the digital terminal 15 and the rate converter 16a. However, the initial connection may be between the digital terminal 15 and the modulator/demodulator 16b. If this arrangement is adopted, connection time can be shortened, in comparison with the case in which the connection is to the digital network, when where there are many outgoing calls to the analog network.

(2) Further, an arrangement can be adopted in which information LNT, which specifies the classification of the network accommodating the terminal communicated with last, is stored in the memory of the processor 16h, as shown in FIG. 13(a). When a call is placed from the digital terminal 15, the connection controller 16h-2, on the basis of the information LNT, connects the digital terminal to the rate converter or modulator/demodulator conforming to the network accommodating the terminal communicated with last.

(3) Furthermore, an arrangement can be adopted in which the classification of each network accommodating a called party's terminal is stored cumulatively whenever an outgoing call is placed. Then, when an outgoing call is placed at a later time, the connection controller 16h-2 refers to this accumulated information to decide the destination to which the digital terminal is to be connected. For example, on the basis of the destinations to which the digital terminal has been connected and whether or not outgoing calls to these destinations have been refused, the connection controller 16h-2 cumulatively stores the correlation between the called party's telephone numbers and the classifications of the networks accommodating the terminals having these telephone numbers (where the classification indicates whether a particular terminal is accommodated by an ISDN or by an analog network), as illustrated in FIG. 13. Then, when a call is subsequently placed from the digital terminal, the connection controller 16h-2' refers to this correlation, identifies whether the called party's terminal is accommodated by an analog network or digital network, connects the calling terminal to the modulator/demodulator 16b if the called party's terminal is accommodated by the analog network and connects the calling terminal to the rate converter 16a if the called party's terminal is accommodated by the ISDN.

(4) In a case where the classification of the network accommodating a terminal, i.e., the distinction between a digital terminal and an analog terminal, can be determined from the telephone owing to the system of the dialed number, the correlation between the systems of dialed numbers and the classifications of the accommodating networks can be stored in memory beforehand, as shown in FIG. 13(c). Then, when an outgoing call is placed, the destination to which the digital terminal is to be connected can be determined using this correlation.

(5) Further, an arrangement can be adopted in which the analog/digital distinction is designated by entering a specific number from the digital terminal 15 or by operating a function key that is for the purpose of selecting the connection destination, and the connection controller 16h-2 changes over the connection destination of the digital terminal 15 based upon this designation. This method is convenient in a situation in which the calling party knows that the called party's termination is a digital terminal or an analog terminal.

Terminating Procedure

Figure 14:
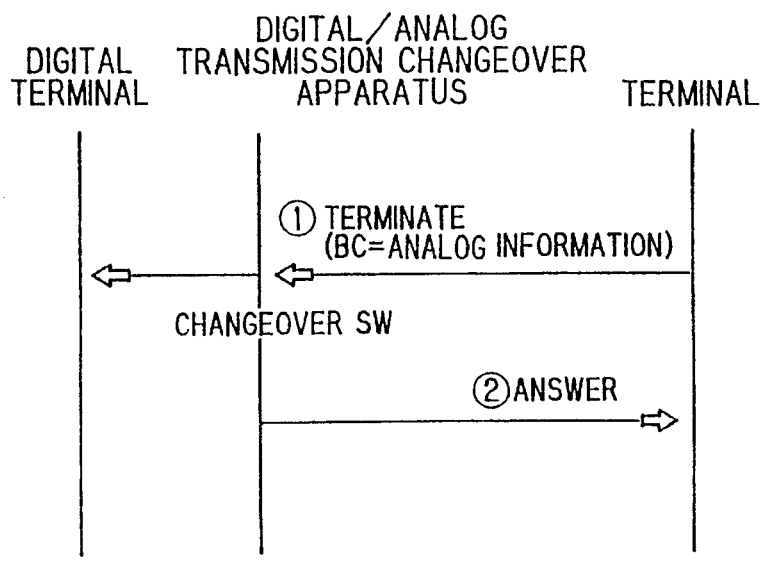
FIG. 14 is a diagram for describing a call terminating procedure.
Figure 15:
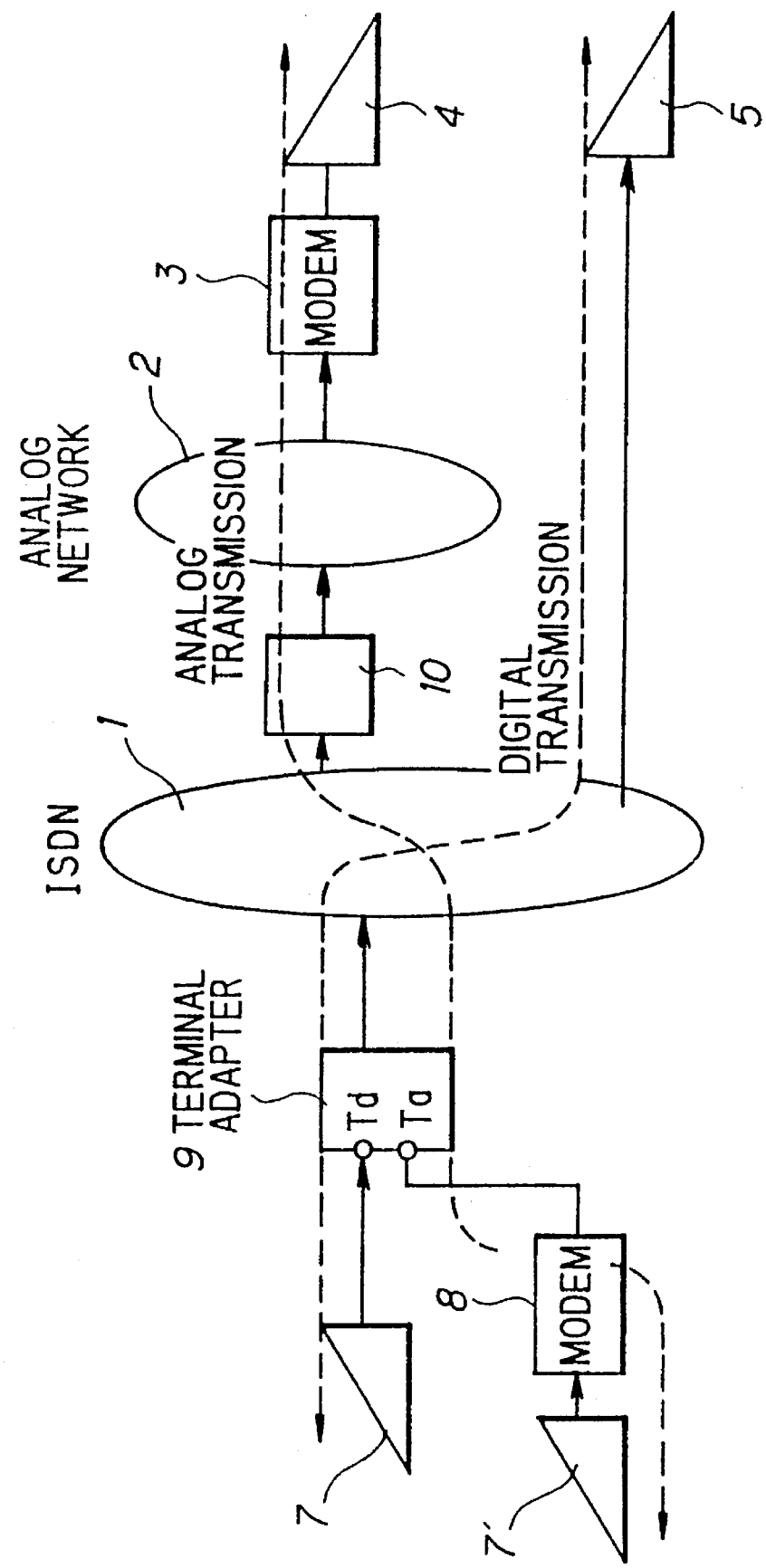
FIG. 15 is a diagram showing the configuration of a communication system according to the prior art.
Figure 16:
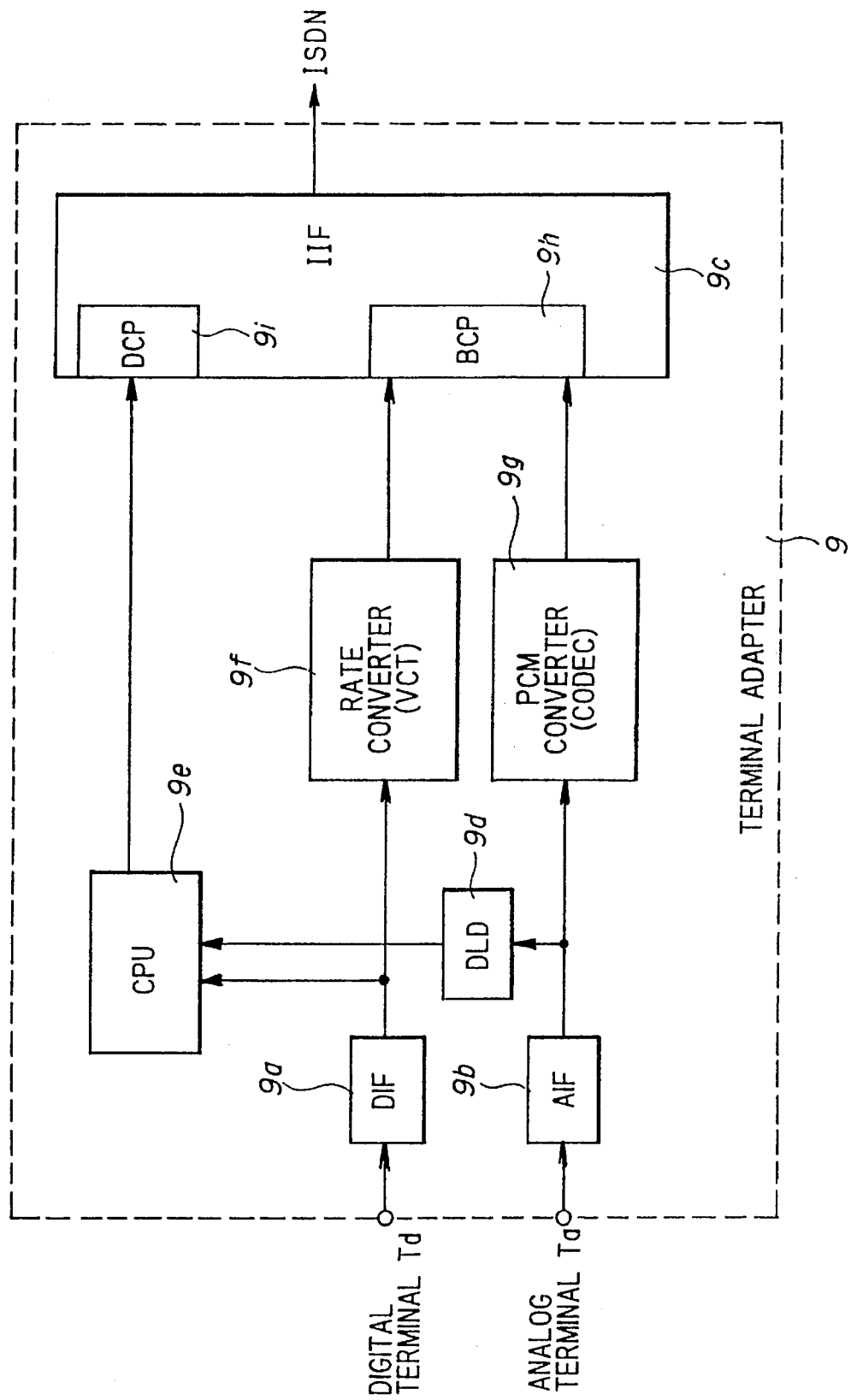
FIG. 16 is block diagram illustrating the construction of a terminal adapter according to the prior art.

FIG. 14 is a diagram for describing a call terminating procedure. This is for a case in which the digital terminal 15 terminates a call.

(1) When the SET-UP message for setting up a call is received from the ISDN 11, the call processing controller 16h-1 of the digital-transmission/analog-transmission changeover apparatus 16 determines whether the bearer capability BC contained in the SET-UP message is "digital" or "analog". If the bearer capability BC is "digital", the connection controller 16h-2 controls the changeover unit 16f to connect the digital terminal 15 and the rate converter 16a. If the bearer capability BC is "analog", the digital terminal 15 and the modulator/demodulator 16b are connected. After the connection is made, notification of this fact is sent to the digital terminal 15.

(2) The call processing controller 16h-1 gives notification of the answer to the originating terminal via the ISDN. Communication is made possible as a result of this operation. If the bearer capability BC is "digital", the data enters the speed converter 16a via the ISDN interface 16g. The rate converter 16a converts the 64 kb/s digital data to a rate conforming to the digital terminal and then sends the data to the digital terminal via the changeover unit 16f and digital interface 16e.

In a case where the bearer capability BC is "analog", the data enters the PCM converter 16c via the ISDN interface 16g. The PCM converter 16c converts the 64 kb/s digital data into an analog signal and applies the analog signal to the modulator/demodulator 16b. The latter demodulates the analog signal to a digital signal and sends the digital signal to the digital terminal via the changeover unit 16f and digital interface 16e.

Thus, in accordance with the present invention, it is so arranged that a digital terminal is connected to a rate converter if the digital terminal communicates with a terminal accommodated by an ISDN and to a modulator/demodulator if the digital terminal communicates with a terminal accommodated by an analog network, as a result of which a transmission is performed digitally or in analog fashion. As a result, a single digital terminal is capable of communicating with terminals accommodated by both analog networks and ISDNs and without the need of a modem.

Further, in accordance with the invention, a call processing controller makes "digital" the bearer capability BC contained in a SET-UP message if the digital terminal is connected to the rate converter and makes "analog" the bearer capability BC if the digital terminal is connected to the modulator/demodulator. The ISDN refuses an incoming call in a case where the bearer capability BC contained in the SET-UP message is "digital" and the called party's terminal is accommodated by an analog network and in a case where the bearer capability BC is "analog" and the called party's terminal is accommodated by a digital network. In response to refusal of the incoming call, the connection controller changes over the destination to which the digital terminal is connected and the call processing controller changes the bearer capability BC, which is contained in the SET-UP message, from "digital" to "analog" or from "analog" to "digital" and then places the outgoing call again automatically. As a result, the user is capable of communicating without knowing whether the called party's terminal is accommodated by an analog network or by an ISDN.

Furthermore, in accordance with the invention, if the bearer capability BC contained in the SET-UP message is "digital" at the time of an incoming call, the digital terminal and the speed converter are connected together. If the bearer capability BC contained in the SET-UP message is "analog" at the time of an incoming call, the digital terminal and the modulator/demodulator are connected together. As a result, data can be received by a single digital terminal through a digital transmission or analog transmission from both a terminal accommodated by an analog network and a terminal accommodated by an ISDN.

As many apparently widely different embodiments of the present invention can be made without departing from the spirit and scope thereof, it is to be understood that the invention is not limited to the specific embodiments thereof except as defined in the appended claims.

What is claimed is:

1. A digital-transmission/analog-transmission changeover apparatus in a communication system in which a digital transmission is performed between a digital terminal and a terminal accommodated by an integrated service digital network (ISDN), and an analog transmission is performed, via the ISDN and an analog network, between the digital terminal and a terminal accommodated by the analog network, the digital-transmission/analog-transmission changeover apparatus being connected between the digital terminal and the ISDN and comprising:

a rate converter for converting the rate of data, which has entered from the digital terminal, to a rate suited to the ISDN, and for converting the rate of data, which has entered from the ISDN, to the rate of the digital terminal;

a modulator/demodulator for modulating digital data, which has entered from the digital terminal, into a first analog signal and demodulating a second analog signal into digital data;

a pulse code modulator (PCM) converter connected to the modulator/demodulator for converting the first analog signal, which has entered from said modulator/demodulator, into digital data at the rate suited to the ISDN, and converting digital data from the ISDN into the second analog signal and entering the second analog signal in said modulator/demodulator;

an ISDN communication controller connected to said rate converter and said PCM converter for performing communication control in accordance with an ISDN protocol; and a connecting unit for selectively connecting the digital terminal to said rate converter or to said modulator/demodulator.

2. The apparatus according to claim 1, wherein the ISDN communication controller includes a connection controller for connecting the digital terminal to said rate converter by said connecting unit if the digital terminal is to communicate with the terminal accommodated by the ISDN, and connecting the digital terminal to said modulator/demodulator by said connecting unit if the digital terminal is to communicate with the terminal accommodated by the analog network.

3. The apparatus according to claim 2, wherein the ISDN communication controller includes a call controller for making information, which is contained in a SET-UP message for a call set-up and indicates distinction between the analog transmission and the digital transmission, "digital" in a case where the digital terminal is connected to said rate converter, and making information, which is contained in the SET-UP message for call set-up and indicates distinction between the analog transmission and the digital transmission, "analog" in a case where the digital terminal is connected to said modulator/demodulator;

said call controller changing said information contained in the SET-UP message from "digital" to "analog" in response to an incoming-call refusal sent from the ISDN in a case where said information is "digital" and a called party's terminal is accommodated by the analog network;

said call controller changing said information contained in the SET-UP message from "analog" to "digital" in response to an incoming-gall refusal sent from the ISDN in a case where said information is "analog" and the called party's terminal is accommodated by the digital network; and said connection controller controlling said connecting unit in response to the incoming-call refusal to change over a destination to which the digital terminal is connected.

4. The apparatus according to claim 3, wherein said connection controller accumulates a correlation between called party's telephone numbers and classifications of networks accommodating called party's terminals, refers to said correlation at origination of an outgoing call to identify whether the called party's terminal is accommodated by the analog network or by the ISDN, connects the call-originating digital terminal to said modulator/demodulator if the called party's terminal is accommodated by the analog network and connects the call-originating digital terminal to said rate converter if the called party's terminal is accommodated by the ISDN.

5. The apparatus according to claim 2, wherein said connection controller responds to origination of a call from the digital terminal by connecting said digital terminal to a preset one of said rate converter and modulator/demodulator.

6. The apparatus according to claim 2, wherein said connection controller responds to origination of a call from the digital terminal by connecting said digital terminal to whichever of said rate converter and said modulator/demodulator a connection was made to last.

7. The apparatus according to claim 2, wherein said connection controller connects the digital terminal and said rate converter together if information contained in a SET-UP message for call set-up is "digital" at the time of an incoming call and connects the digital terminal and said modulator/demodulator together if information contained in the SET-UP message for call set-up is "analog" at the time of the incoming call.

8. The apparatus according to claim 2, wherein a connection destination is designated from the digital terminal and said connection controller changes over the connection destination of the digital terminal based upon the designation.

* * * * *